(12) United States Patent
Sawada (10) Patent No.: US 11,124,062 B2
(45) Date of Patent: Sep. 21, 2021

(54) FUEL CELL VEHICLE

(71) Applicant: TOYOTA JIDOSHA KABUSHIKI KAISHA, Toyota (JP)

(72) Inventor: Yutaka Sawada, Nagakute (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 61 days.

(21) Appl. No.: 16/752,937

(22) Filed: Jan. 27, 2020

(65) Prior Publication Data

US 2020/0247234 A1  Aug. 6, 2020

(30) Foreign Application Priority Data

Jan. 31, 2019 (JP) .............................. JP2019-015206

(51) Int. Cl.
| | | |
|---|---|---|
| *B60K 15/067* | (2006.01) | |
| *B62D 21/15* | (2006.01) | |
| *B62D 25/08* | (2006.01) | |
| *B60K 15/03* | (2006.01) | |

(52) U.S. Cl.
CPC .......... *B60K 15/067* (2013.01); *B62D 21/152* (2013.01); *B62D 25/08* (2013.01); *B60K 2015/03315* (2013.01); *B60K 2015/0675* (2013.01); *B60Y 2400/102* (2013.01)

(58) Field of Classification Search
CPC .................. B60K 15/067; B60K 15/07; B60K 2015/0675; B60K 2015/03315; B60K 2015/03309; B62D 21/152; B62D 21/155; B62D 25/08; B60Y 25/08
See application file for complete search history.

(56) References Cited

U.S. PATENT DOCUMENTS

| | | | |
|---|---|---|---|
| 9,145,052 B2 * | 9/2015 | De Biasi | ................ B60K 15/07 |
| 9,321,346 B2 * | 4/2016 | Shipp | ................... B60K 15/063 |
| 10,556,506 B2 * | 2/2020 | Sasaki | .................. B60K 15/067 |
| 2010/0045018 A1 * | 2/2010 | Kondo | ................... B60K 15/07 |
| | | | 280/834 |
| 2017/0240045 A1 | 8/2017 | Ohashi | |
| 2017/0334288 A1 | 11/2017 | Rike et al. | |

FOREIGN PATENT DOCUMENTS

| | | | | |
|---|---|---|---|---|
| DE | 102006021710 A1 | * | 11/2007 | ............. B60K 15/03 |
| DE | 102017102245 A1 | | 8/2017 | |
| JP | H10-016578 | | 1/1998 | |

* cited by examiner

*Primary Examiner* — Lori L Lyjak (74) *Attorney, Agent, or Firm* — Finnegan, Henderson, Farabow, Garrett & Dunner, LLP (57) ABSTRACT

A fuel cell vehicle is a fuel cell vehicle configured to support a fuel tank including a cylindrical part extending in a longitudinal direction thereof, the fuel cell vehicle including vehicle body frames, and a tank frame. The vehicle body frames extend in the longitudinal direction between a front tire and a rear tire. The tank frame includes at least a fixing part fixed to the vehicle body frames, and a supporting part configured to support the fuel tank by extending in an outward and downward direction of the vehicle body frames, and coming into contact with the fuel tank below a lower end of the vehicle body frames and above a lowermost part of the cylindrical part.

7 Claims, 6 Drawing Sheets

FUEL CELL VEHICLE

CROSS REFERENCE TO RELATED APPLICATIONS

This application is based upon and claims the benefit of priority from Japanese patent application No. 2019-15206, filed on Jan. 31, 2019, the disclosure of which is incorporated herein in its entirety by reference.

BACKGROUND

The present disclosure relates to a fuel cell vehicle.

A fuel cell vehicle, on which a fuel cell generating electric power by mixing a fuel gas and an oxidizing gas is mounted, has been developed. A fuel tank filled with hydrogen is mounted on some fuel cell vehicles in order to use gas mainly containing hydrogen as a fuel gas.

When a truck type vehicle equipped with a loading platform is also equipped with a fuel tank, it is desired that the fuel tank be located so as not to sacrifice the space of the loading platform. Commonly, in a truck type vehicle, a vehicle body frame extending in the longitudinal direction of the vehicle preferably has a linear shape in order to increase the rigidity in the longitudinal direction of the vehicle body frame. Further, the vehicle body frame is preferably located as low as possible in order to leave a space for the loading platform. Under such conditions, for example, Japanese Unexamined Patent Application Publication No. H10-016578 discloses a configuration in which a container for gas fuel is located on a vehicle body frame and fixed so that the longitudinal direction of the vehicle is the axial direction of the fuel container.

SUMMARY

When the technique disclosed in Japanese Unexamined Patent Application Publication No. H10-016578 is applied to a fuel cell vehicle, a space for storing components inside the frame is limited, whereby a fuel tank of a FC truck cannot be located inside the frame. Thus, the fuel tank is located on the outer side surface of the vehicle body frame. However, in a case where the fuel tank is located on the outer side surface of the vehicle body frame, if another vehicle collides with the own vehicle from the side surface thereof, the fuel tank may be caught between the vehicle body frame of the own vehicle and the other vehicle, whereby the fuel tank may be damaged.

The present disclosure has been made in view of the aforementioned problems and provides a fuel cell vehicle that prevents a fuel tank from being damaged when it receives an impact from a side surface of the vehicle body.

A first exemplary aspect is a fuel cell vehicle configured to support a fuel tank including a cylindrical part extending in a longitudinal direction thereof, the fuel cell vehicle including a vehicle body frame, and a tank frame. The vehicle body frame extends in the longitudinal direction between a front tire and a rear tire. The tank frame includes at least a fixing part fixed to the vehicle body frame, and a supporting part configured to support the fuel tank by extending in an outward and downward direction of the vehicle body frame, and coming into contact with the fuel tank below a lower end of the vehicle body frame and above a lowermost part of the cylindrical part.

Such a configuration enables the fuel cell vehicle to move the fuel tank downward below the vehicle body frame when it receives an impact from a side surface of the vehicle body.

In the aforementioned fuel cell vehicle, the supporting part included in the tank frame preferably supports the fuel tank between the lowermost part of the fuel tank and the lower end of the vehicle body frame. This configuration enables the fuel cell vehicle to transfer a force received by the fuel tank downward below the vehicle body frame when it receives an impact from a side surface of the vehicle body.

In the aforementioned fuel cell vehicle, it is preferred that the fixing part included in the tank frame include a contact surface configured to come into contact with a side surface of the vehicle body frame; and the tank frame be fixed to the vehicle body frame on the contact surface. This configuration enables the fuel cell vehicle to reliably fix the tank frame to the vehicle body frame.

In the aforementioned fuel cell vehicle, in the fixing part, the contact surface and the side surface of the vehicle body frame may be fixed by a first fastening member and a second fastening member located lower than the first fastening member. Further, it is preferred that the first and the second fastening members be both bolts, and a nominal diameter of a screw part of the first fastening member be smaller than that of a screw part of the second fastening member. This configuration enables the fuel cell vehicle to reliably fix the tank frame to the vehicle body frame, and to satisfactorily transfer a force received by the fuel tank downward below the vehicle body frame by configuring the first and the second fastening members to be sequentially broken when an impact is received from the side surface of the vehicle body.

In the aforementioned fuel cell vehicle, it is preferred that the tank frame further include a first beam extending downward from the fixing part, and a second beam extending in a horizontal direction from a lower end of the first beam toward an outside of the vehicle body frame, and the supporting part be provided so as to connect the first beam to the second beam. Such a configuration enables the fuel cell vehicle to transfer a force received by the fuel tank downward below the vehicle body frame when an impact is received from the side surface of the vehicle, while the fuel cell vehicle stably supports the fuel tank.

The aforementioned fuel cell vehicle may further include a pressing member configured to bring the fuel tank into contact with the supporting part by one end of the pressing member being engaged with the first beam, the other end thereof being engaged with the second beam, and a middle part thereof coming into contact with an upper side of the fuel tank. By doing so, in the fuel cell vehicle, the aforementioned supporting member can reliably support the fuel cell.

According to the present disclosure, it is possible to provide a fuel cell vehicle that prevents a fuel tank from being damaged when it receives an impact from a side surface of the vehicle body.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

For the clarification of the description, the following description and the drawings are partially omitted or simplified as appropriate. Note that throughout the drawings, the same components are denoted by the same reference signs and repeated descriptions are omitted as necessary.

Embodiment

Figure 1:
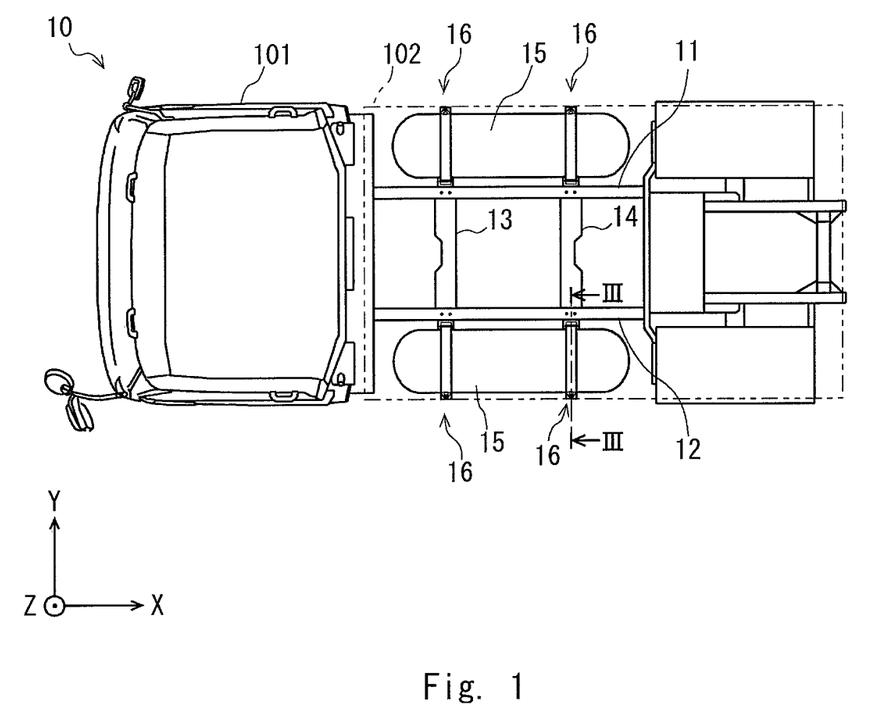
FIG. 1 is a top view of a fuel cell vehicle according to an embodiment.
Figure 2:
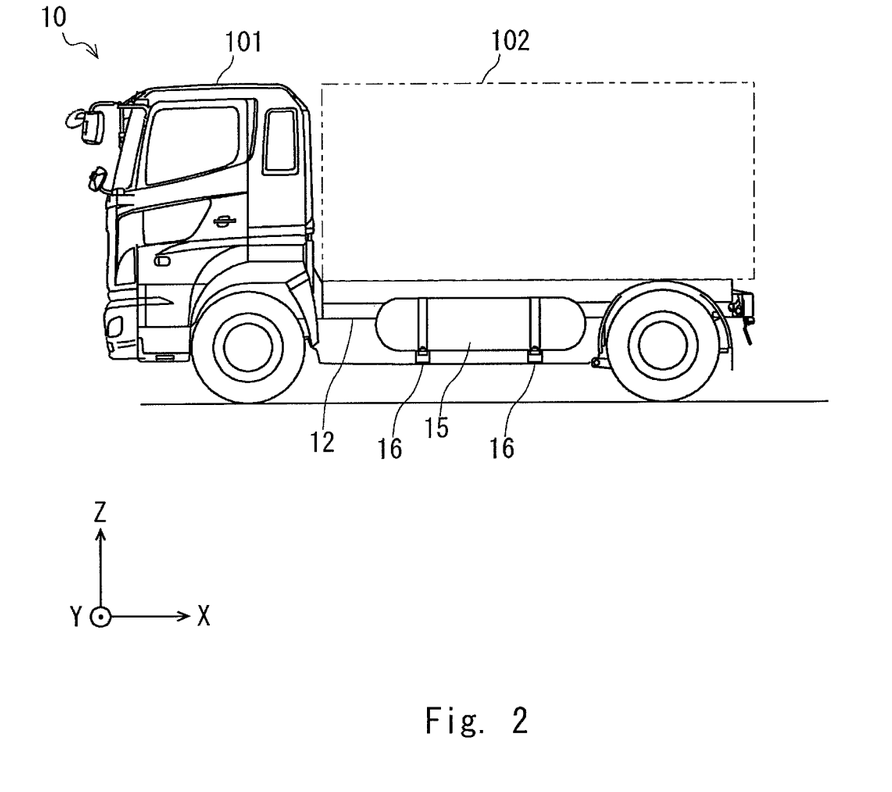
FIG. 2 is a side view of the fuel cell vehicle according to the embodiment.

An embodiment of the present disclosure is described hereinafter with reference to the drawings. FIG. 1 is a top view of a fuel cell vehicle according to the embodiment. FIG. 2 is a side view of the fuel cell vehicle according to the embodiment. Note that for the sake of convenience in explaining a positional relation among components, a right-handed orthogonal coordinate system is shown in FIGS. 1 and 2. In the orthogonal coordinate system shown in FIGS. 1 and 2, the X axis coincides with the longitudinal direction of the vehicle, the Y axis coincides with the lateral direction of the vehicle, and the Z axis coincides with the vertical direction of the vehicle. Further, the X-axis negative side coincides with the front of the vehicle, the X-axis positive side coincides with the rear of the vehicle, the Y-axis negative side coincides with the left direction of the vehicle, the Y-axis positive side coincides with the right direction of the vehicle, the Z-axis negative side coincides with the lower side of the vehicle, and the Z-axis positive side coincides with the upper side of the vehicle. In the following figures, when an orthogonal coordinate system is shown, the X-axis, the Y-axis, and the Z-axis directions of the orthogonal coordinate system in FIGS. 1 and 2 coincide with the X-axis, the Y-axis, and the Z-axis directions of the orthogonal coordinate systems in those figures, respectively.

A fuel cell vehicle 10 according to the embodiment is a truck in which a loading platform 102 is connected to the rear of a cabin 101 including a driver's seat. Note that to make understanding easier, the loading platform 102 is indicated by a dot-dot-dash line. The fuel cell vehicle 10 includes a right vehicle body frame 11 and a left vehicle body frame 12 as vehicle body frames on the rear side of the cabin 101 and below the loading platform 102. The right vehicle body frame 11 is located slightly inside the right tires, and extends in the longitudinal direction between the right front tire and, the right rear tire. The left vehicle body frame 12 is located slightly inside the left tires, and extends in the longitudinal direction between the left front tire and the left rear tire. The right vehicle body frame 11 and the left vehicle body frame 12 are distant from each other in the lateral direction, and extend in parallel at the same position in the height direction.

The fuel cell vehicle 10 includes a front cross member 13 and a rear cross member 14 as cross members between the right vehicle body frame 11 and the left vehicle body frame 12. The front cross member 13 and the rear cross member 14 extend between the right vehicle body frame 11 and the left vehicle body frame 12 in the lateral direction, and connect the right vehicle body frame 11 to the left vehicle body frame 12. The vehicle body frames and the cross members are bonded to each other, for example, by welding.

The fuel cell vehicle 10 includes two fuel tanks 15 below the loading platform 102 and outside the vehicle body frames. Each of the fuel tanks 15 is filled with hydrogen gas. Each of the fuel tanks 15 has a shape in which a cylindrical part connects both hemispherical ends thereto. As shown in FIGS. 1 and 2, the fuel tanks 15 are fixed below the loading platform 102 and to the right side of the right vehicle body frame 11, and below the loading platform 102 and to the left side of the left vehicle body frame 12, respectively, in a posture in which the respective cylindrical parts each extend in the longitudinal direction.

The fuel cell vehicle 10 includes a tank frame 16 in the vicinity of each part where the vehicle body frames and the cross members are bonded. Each of the tank frames 16 is a member for supporting one of the fuel tanks 15.

Figure 3:
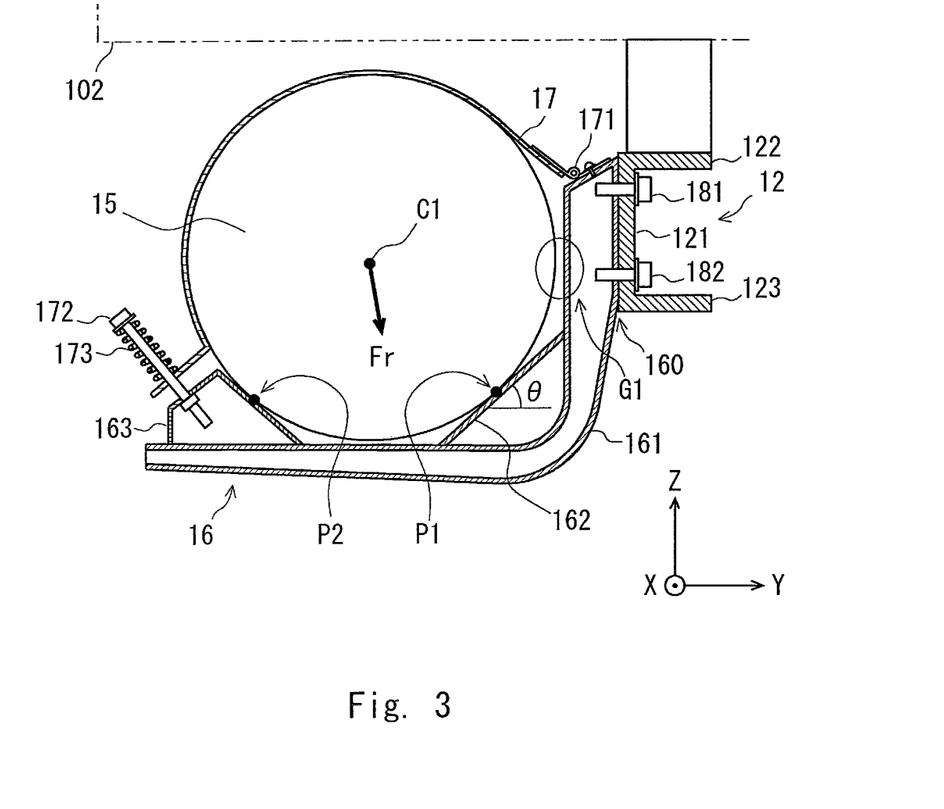
FIG. 3 is a cross-sectional view of a supporting structure of a fuel tank in the fuel cell vehicle according to the embodiment.

The details of the tank frame 16 and a supporting structure of the fuel tank 15 are described with reference to FIG. 3. FIG. 3 is a cross-sectional view of the supporting structure of the fuel tank in the fuel cell vehicle according to the embodiment. FIG. 3 shows a state in which the cross section III of the left fuel tank in the fuel cell vehicle 10 shown in FIG. 1 is observed from the rear. Note that although the structure of this embodiment will be described using the structure of the left side of the vehicle as an example, the structure of the right side of the vehicle is symmetrical with respect to that of the left side of the vehicle, and thus has the same configuration and structure as those of the left side of the vehicle. As shown in FIG. 3, the fuel cell vehicle 10 includes the left vehicle body frame 12, the tank frame 16, and a tank band 17 as main components for supporting the fuel tank 15.

The left vehicle body frame 12 is composed of a long-length vertical plate 121 of which the main surface is orthogonal to the lateral direction, and horizontal plates 122 and 123, each of which horizontally extends from the upper and lower ends of the vertical plate 121 toward the inside of the vehicle. The tank frame 16 is screwed into the vertical plate 121 with a first fastening member 181 and a second fastening member 182.

The first fastening member 181 is inserted through the vertical plate 121 above the second fastening member 182, and is screwed into the tank frame 16 so as to sandwich the vertical plate 121 therebetween. Similarly, the second fastening member 182 is inserted through the vertical plate 121 below the first fastening member 181, and is screwed into the tank frame 16 so as to sandwich the vertical plate 121 therebetween.

The tank frame 16 is a member manufactured so as to support the fuel tank 15, using a substantially L-shaped metallic hollow member as a base material. The tank frame 16 includes a fixing part 160, a main body 161, a supporting part 162, and a convex part 163 as main components.

The fixing part 160 includes a contact surface that comes into contact with the vertical plate 121 of the left vehicle body frame 12. The contact surface comes into contact with the vertical plate 121 so that the tank frame 16 is fixed by the first and the second fastening members 181 and 182. The first and the second fastening members 181 and 182 are, for example, bolts.

The main body 161 extends downward from the fixing part 160, bends below the lower end of the left vehicle body frame 12, and horizontally extends in a direction away from the left vehicle body frame 12. Note that in the main body 161, a part extending downward from the fixing part 160 is referred to as a first beam, and a part extending in the horizontal direction from the lower end of the first beam toward the outside of the vehicle body frame is referred to as a second beam. As the main body 161 includes the first beam and the second beam, the tank frame 16 can stably support the fuel tank 15.

Further, the part of the main body 161 that is furthest from the left vehicle body frame 12 and extends in the direction away from the left vehicle body frame 12 is referred to as a front end of the main body 161. The convex 163 is provided at the front end of the main body 161. A screw hole to which a screw 172 is screwed is provided in the convex part 163. Meanwhile, a hinge part 171 is provided at the upper end of the main body 161. The hinge part 171 includes the rotation axis provided parallel to the longitudinal direction, and is engaged with the tank band 17.

The supporting part 162 supports the fuel tank below the lower end of the vehicle body frame. The upper end of the supporting part 162 is bonded to the first beam extending vertically of the main body 161. Further, the supporting part 162 extends obliquely from the upper end in the outward and downward direction of the vehicle body frame. Furthermore, the supporting part 162 extending obliquely is bonded to the second beam extending horizontally of the main body 161.

As described above, the supporting part 162 extending obliquely has an inclined surface having an angle of θ with respect to the horizontal plane, and is provided so as to connect the first beam to the second beam. Accordingly, a part constituted by the L-shaped main body 161 and the supporting part 162 has a truss structure.

The tank frame 16 supports the fuel tank 15 at a contact point P1 on the inclined surface of the supporting part 162, and supports the fuel tank 15 at a contact P2 on the convex part 163 located at the front end of the main body 161. At this time, the contact P1 is positioned below the lower end of the left vehicle body frame 12. Further, the contact P1 is positioned above the lowermost part of the fuel tank 15. That is, the supporting part 162 is configured to support the fuel tank 15 between the lowermost part of the fuel tank 15 and the lower end of the vehicle body frame.

Note that as the part of the main body 161 that extends vertically and the fuel tank 15 are not in contact with each other, there is a gap between them. That is, the fuel cell vehicle 10 has a space G1 between the fuel tank 15 and the first beam of the tank frame 16.

The tank band 17 is a member for fixing the fuel tank 15 by pressing it against the tank frame 16. The tank band 17 is composed of a long-length metal plate, and the middle part thereof comes into contact with a predetermined extent of the cylindrical part of the fuel tank 15 along the cylindrical part thereof. The part in contact with the cylindrical part comes into contact with the fuel tank 15 and presses the fuel tank 15.

Note that the predetermined extent is an extent within which the fuel tank 15 can be pressed against the contact points P1 and P2 with the tank frame 16. Such a predetermined extent is preferably a wide extent so as to prevent a stress concentration from being locally applied to the cylindrical part of the fuel tank 15.

Further, when a resultant force Fr of the force that the tank band 17 presses the fuel tank 15 with is indicated by a vector extending from a center C1 of the cylindrical part, the vector direction is preferably oriented in a direction between the contacts P1 and P2. Such a configuration enables the tank frame 16 to satisfactorily support the fuel tank 15.

One long-length end side of the tank band 17 is engaged with the hinge part 171 provided at the upper end of the main body 161, and is located rotatably around an axis parallel to the X axis. Further, the other long-length end side of the tank band 17 is locked by the screw 172 and a coil spring 173 in the convex part 163 at the front end part of the main body 161. The screw 172 is inserted through the coil spring 173 and the tank band 17, and is screwed into the screw hole provided at the front end of the main body 161. The coil spring 173 is a compression coil spring that is interposed between the head part of the screw 172 and the tank band 17, and energizes the tank band 17 substantially downward. Due to the coil spring 173 energizing the tank band 17 substantially downward, the tank band 17 can satisfactorily press the fuel tank 15 against the tank frame 16.

Note that the tank band 17 may have flexibility. When the tank band 17 has flexibility, the supporting structure of the fuel tank 15 can satisfactorily come into contact with the fuel tank 15 along the cylinder, thereby dispersing the pressing force applied to the fuel tank 15.

Figure 4:
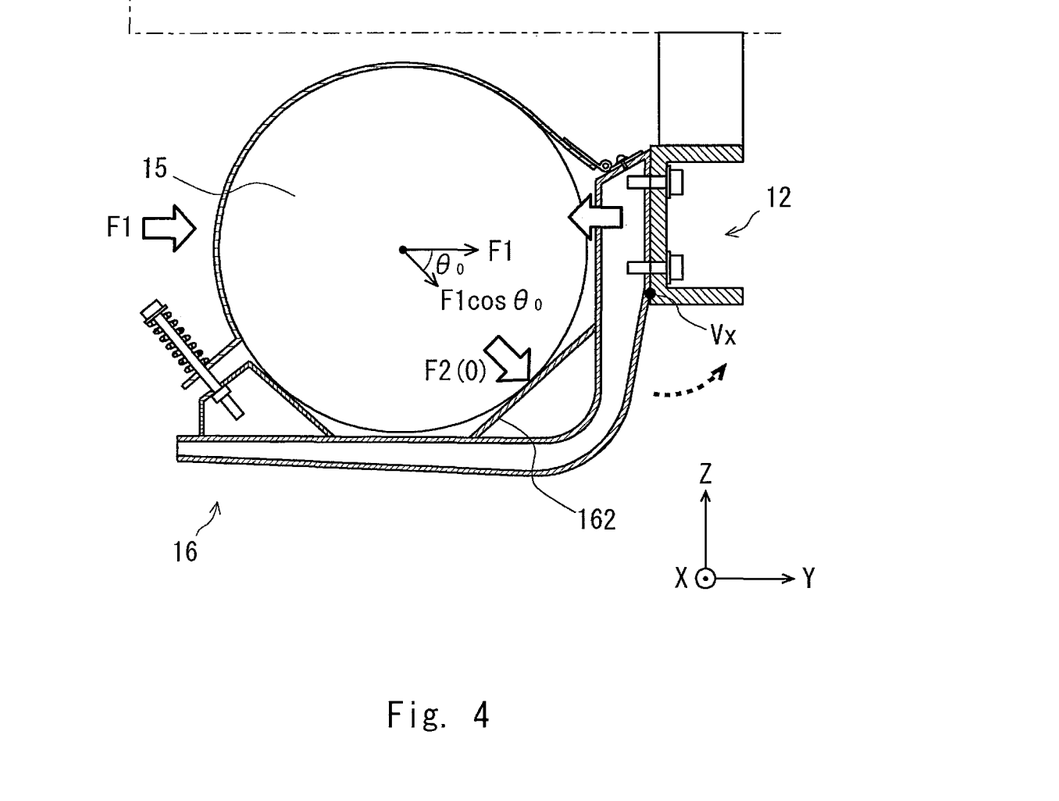
FIG. 4 is a first diagram showing an example of a state in which an external force is applied to the fuel tank from a side of the fuel cell vehicle.
Figure 5:
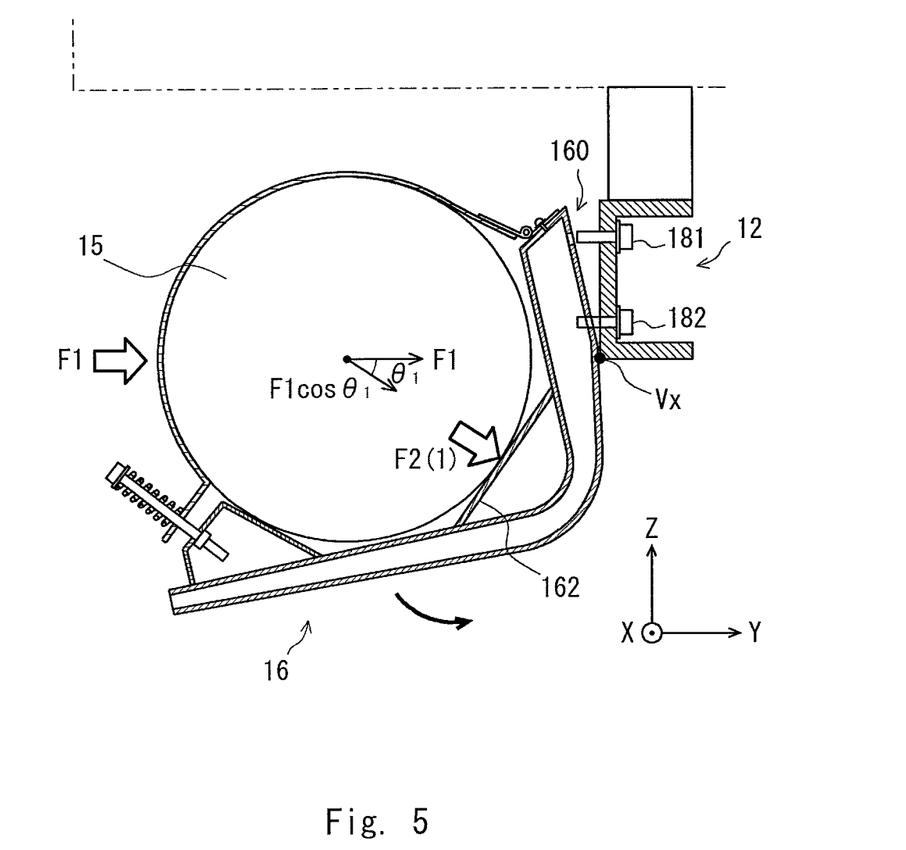
FIG. 5 is a second diagram showing an example of a state in which an external force is applied to the fuel tank from the side of the fuel cell vehicle.

Next, a behavior of the supporting structure of the fuel tank 15 when an external force is applied thereto from a side of the fuel cell vehicle 10 is described with reference to FIGS. 4 to 6. FIG. 4 is a first diagram showing an example of a state in which an external force is applied to the fuel tank from the side of the fuel cell vehicle. In FIG. 4, an external force F1 indicates a force applied in the lateral direction with respect to the fuel tank 15. The direction of the external force F1 is the Y-axis positive direction. The magnitude of the external force F1 is such that the supporting structure of the fuel tank 15 can be broken. Accordingly, the supporting structure of the fuel tank 15 of the fuel cell vehicle 10 to which the external force F1 has been applied is broken by the external force F1.

In such a situation, the supporting part 162 supporting the fuel tank 15 receives a divided force F2 as a divided force of the external force F1. The divided force F2 is a force in a direction perpendicular to the inclination of the supporting part 162, that is, a direction in which the fuel tank 15 is moved downward and inward of the vehicle. Further, a relation between the external force F1 and the divided force F2 is the relation indicated by the following expression (1).

[Expression 1]

$$F2(n) = F1 \cos \theta_n \tag{1}$$

where n is any integer, $F2(n)$ indicates the divided force F2 in a predetermined state n, and $\theta_n$ indicates an angle which the perpendicular line to the supporting part 162 forms with the horizontal plane in the predetermined state n. Here, the state shown in FIG. 4 is a state 0. Accordingly, the divided force $F2(0)$ in the state 0 is $F1 \cos \theta_0$.

Due to the divided force $F2(0)$ acting on the contact point P1 of the supporting part 162, a force to move the tank frame 16 in the direction of the divided force $F2(0)$ acts on the tank frame 16. The direction of the divided force $F2(0)$ is a direction in which the supporting part 162 is pressed downward and inward of the vehicle. Meanwhile, the tank frame 16 is fixed to the left vehicle body frame 12 by the fixing part 160. Therefore, the tank frame 16 about to be forced to rotate counterclockwise around a virtual fulcrum Vx, which is at the lower end of the contact surface with the left vehicle body frame 12, as an instantaneous center.

Next, the behavior of the supporting structure of the fuel tank 15 is further described with reference to FIG. 5. FIG.

5 is a second diagram showing an example of a state in which an external force is applied to the fuel tank from the side of the fuel cell vehicle. Here, the state shown in FIG. 5 is a state 1. The angle formed by the perpendicular line to the supporting part 162 and the horizontal plane in the state 1 is $\theta_1$, and the divided force F2(1) is F1 cos $\theta_1$.

When the counterclockwise force centered on the virtual fulcrum Vx has acted on the tank frame 16, the tank frame 16 is consequently released from the fastening by the first and the second fastening members 181 and 182 in the fixing part 160. More specifically, for example, the first and the second fastening members 181 and 182 may be broken by a pulling force acting thereon. Alternatively, the fixing part 160 may be broken to be brought into a predetermined state. In any case, the tank frame 16 is separated from the left vehicle body frame 12 by the divided force F2.

The separation of the fuel tank 15 and the tank frame 16 from the left vehicle body frame 12 starts, and they are rotated counterclockwise around the virtual fulcrum Vx. As the fuel tank 15 and the tank frame 16 are rotated, the divided force F2(1) received by the supporting part 162 in the state 1 shown in FIG. 5 is F1 cos $\theta_1$. The direction of the divided force F2(1) received by the supporting part 162 is a direction in which the supporting part 162 is pressed downward and inward of the vehicle. Therefore, the fuel tank 15 and the tank frame 16 continue to rotate counterclockwise around the virtual fulcrum Vx.

Next, the behavior of the supporting structure of the fuel tank 15 is further described with reference to FIG. 6. FIG. 6 is a third diagram showing an example of a state in which an external force is applied to the fuel tank from the side of the fuel cell vehicle. Here, the state shown in FIG. 6 is a state 2. The angle formed by the perpendicular line to the supporting part 162 and the horizontal plane in the state 2 is $\theta_2$, and the divided force F2(2) is F1 cos $\theta_2$.

Figure 6:
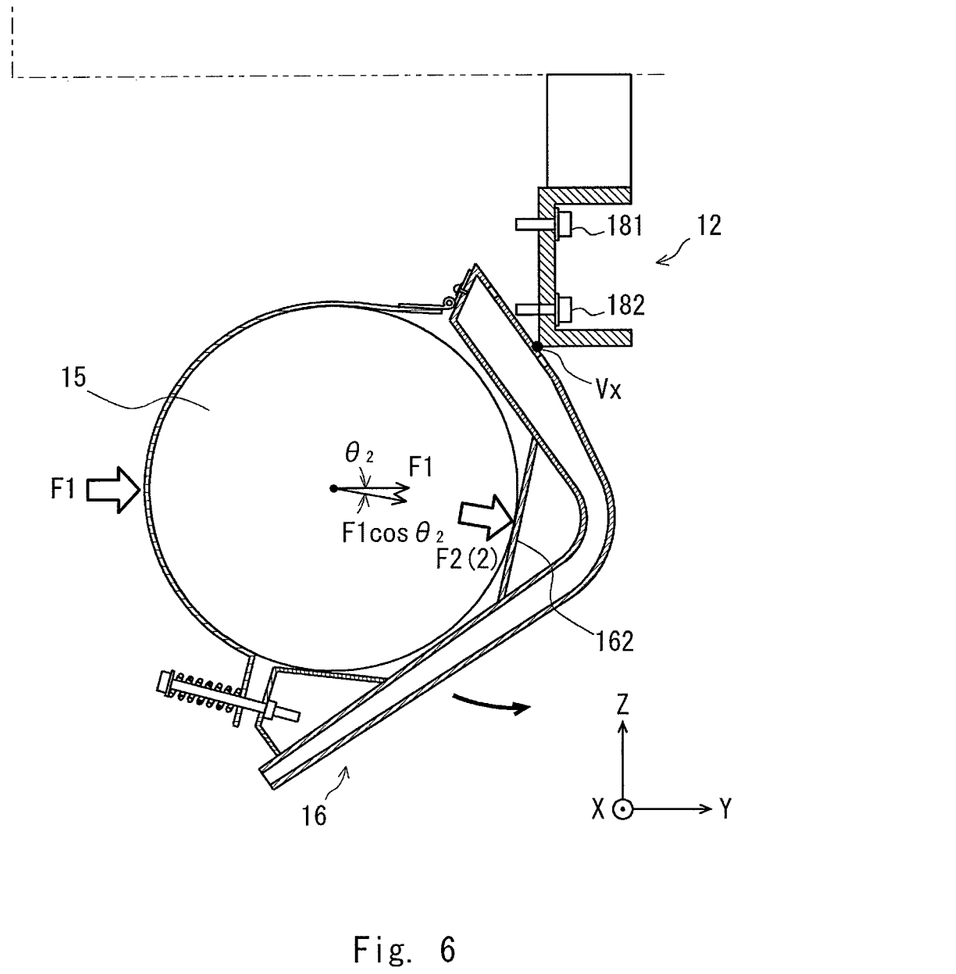
FIG. 6 is a third diagram showing an example of a state in which an external force is applied to the fuel tank from the side of the fuel cell vehicle.

As shown in FIG. 6, the fuel tank 15 and the tank frame 16 are completely separated from the left vehicle body frame 12 by the external force F1. The fuel tank 15 and the tank frame 16 separated from the left vehicle body frame 12 continue to receive the external force F1. The external force F1 received by the fuel tank 15 is transmitted to the supporting part 162 via the fuel tank 15 as the divided force F2(2). Therefore, the fuel tank 15 and the tank frame 16 receive the resultant force of the downward force due to its own weight and the divided force F2(2). Accordingly, the fuel tank 15 and the tank frame 16 move downward while they are being rotated counterclockwise around the virtual fulcrum Vx as an instantaneous center. As a result, the fuel tank 15 and the tank frame 16 move in a direction in which they enter below the vehicle body frame.

Although the embodiment has been described as shown above, the configuration of the fuel cell vehicle 10 according to the embodiment is not limited to that described above. For example, the tank frame 16 may be configured by using, as a base material, a member obtained by bending a hat-shaped structural material at a right angle instead of the hollow frame.

Further, the nominal diameter of the screw part of the first fastening member 181 may be smaller than that of the screw part of the second fastening member 182. By this configuration, the first fastening member 181 is relatively easily broken when an external force is received. As described above, by configuring the first and the second fastening members 181 and 182 to be sequentially broken when an external force is received from the side surface of the vehicle, it is possible to satisfactorily transfer a force received by the fuel tank downward below the vehicle body frame. Note that the first and the second fastening members 181 and 182 may be fixing means such as rivets and welding instead of bolts.

In the above-described embodiment, it is preferred that the fuel tank 15 and the tank frame 16 not be in contact with each other above the contact point P1, and that a predetermined space be left between the fuel tank 15 and the vicinity of the fixing part or the vertically extending part of the tank frame 16. By leaving such a predetermined space, it is possible to reliably transmit the divided force to the supporting part 162 when the fuel tank 15 receives an external force.

The above-described configuration enables the fuel cell vehicle according to the embodiment to move the fuel tank downward below the vehicle body frame when an impact is received from the side surface of the vehicle body. Thus, according to this embodiment, it is possible to provide the fuel cell vehicle that prevents the fuel tank from being damaged when it receives an impact from the side surface of the vehicle body.

The present disclosure is not limited to the above-described embodiments, and can be appropriately changed without departing from the spirit of the disclosure. For example, the supporting structure of the fuel tank according to the embodiment is not limited to being applied to the above-described truck vehicle, and instead it may also be applied to a commercial vehicle such as a tractor vehicle towing a trailer. Further, as a matter of course, the fuel tank may not be supported on both sides thereof as long as it is supported on one side thereof.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A fuel cell vehicle configured to support a fuel tank comprising a cylindrical part extending in a longitudinal direction thereof, the fuel cell vehicle comprising:
   a vehicle body frame extending in the longitudinal direction between a front tire and a rear tire; and
   a tank frame comprising at least a fixing part fixed to the vehicle body frame, and a supporting part configured to support the fuel tank by extending in an outward and downward direction of the vehicle body frame, and coming into contact with the fuel tank below a lower end of the vehicle body frame and above a lowermost part of the cylindrical part.

2. The fuel cell vehicle according to claim 1, wherein the supporting part included in the tank frame supports the fuel tank between the lowermost part of the fuel tank and the lower end of the vehicle body frame.

3. The fuel cell vehicle according to claim 1, wherein
   the fixing part included in the tank frame comprises a contact surface configured to come into contact with a side surface of the vehicle body frame, and
   the tank frame is fixed to the vehicle body frame on the contact surface.

4. The fuel cell vehicle according to claim 3, wherein in the fixing part, the contact surface and the side surface of the vehicle body frame are fixed by a first fastening member and a second fastening member located lower than the first fastening member.

5. The fuel cell vehicle according to claim 4, wherein
the first and the second fastening members are both bolts, and
a nominal diameter of a screw part of the first fastening member is smaller than that of a screw part of the second fastening member.

6. The fuel cell vehicle according to claim 1, wherein
the tank frame further comprises a first beam extending downward from the fixing part, and a second beam extending in a horizontal direction from a lower end of the first beam toward an outside of the vehicle body frame, and
the supporting part is provided so as to connect the first beam to the second beam.

7. The fuel cell vehicle according to claim 6, further comprising a pressing member configured to bring the fuel tank into contact with the supporting part by one end of the pressing member being engaged with the first beam, the other end thereof being engaged with the second beam, and a middle part thereof coming into contact with an upper side of the fuel tank.

* * * * *